United States Patent [19]

Van Den Ende

[11] Patent Number: 4,780,840

[45] Date of Patent: Oct. 25, 1988

[54] METHOD OF GENERATING A PSEUDO-RANDOM SEQUENCE OF SIGNS OF A LARGE SEQUENCE LENGTH

[75] Inventor: Antonius C. J. Van Den Ende, Eindhoven, Netherlands

[73] Assignee: U.S. Philips Corp., New York, N.Y.

[21] Appl. No.: 20,213

[22] Filed: Feb. 25, 1987

Related U.S. Application Data

[63] Continuation of Ser. No. 824,298, Jan. 30, 1986, abandoned, which is a continuation of Ser. No. 505,002, Jun. 16, 1983, abandoned.

[30] Foreign Application Priority Data

Jun. 23, 1982 [NL] Netherlands ............... 8202547

[51] Int. Cl.$^4$ ............................................. G06F 1/02
[52] U.S. Cl. ................................................... 364/717
[58] Field of Search .......................... 364/717; 380/46

[56] References Cited

U.S. PATENT DOCUMENTS

| | | | |
|---|---|---|---|
| 3,808,536 | 4/1974 | Reynolds | 375/1 |
| 3,984,668 | 10/1976 | Zetterberg et al. | 380/46 |
| 4,058,673 | 11/1977 | Johansson | 364/717 |
| 4,133,974 | 1/1979 | Morgan | 375/115 |
| 4,320,513 | 3/1982 | Lampert | 364/717 |
| 4,322,577 | 3/1982 | Brändström | 178/22.05 |
| 4,351,982 | 9/1982 | Miller et al. | 178/22.11 |
| 4,375,579 | 3/1983 | Davida et al. | 380/25 |
| 4,471,164 | 9/1984 | Henry | 178/22.15 |

OTHER PUBLICATIONS

Golomb, S. W., *Digital Communications* p. 12, Prentice Hall Inc. 1964.

Goodman et al. "Pseudorandom Number Generator", *IBM Technical Disclosure Bulletin*, vol. 13, No. 4, p. 920 (1970).

*Primary Examiner*—Gary V. Harkcom
*Assistant Examiner*—Dale Shaw
*Attorney, Agent, or Firm*—Jack E. Haken; Leroy Eason

[57] ABSTRACT

A method by which random bytes are generated. Such a random byte is obtained by adding a prime number once or several times to an 8-bit character. The choice whether a prime number is added once or several times to the 8-bit character depends on whether the preceding addition produced a result larger than or less than 256. The character obtained (modulo 256) also provides the following 8-bit character. A sequence of bits consisting of several bytes is assembled from random bytes thus generated, each byte being generated on the basis of a different prime number.

3 Claims, 2 Drawing Sheets

METHOD OF GENERATING A PSEUDO-RANDOM SEQUENCE OF SIGNS OF A LARGE SEQUENCE LENGTH

This is a continuation of application Ser. No. 824,298, filed Jan. 30, 1986, which was a continuation of application Ser. No. 505,002, filed June 16, 1983 (both now abandoned).

BACKGROUND OF THE INVENTION

Field of the Invention

The invention relates to a method of generating a pseudo-random sequence of signs of a large sequence length.

Pseudo-random sequences of signs are inter alia used in the field of encrypting information. These sequences may alternatively be used as message keys. It is important for these pseudo-random sequences to have a very long repetition period to guarantee that in the event of long messages the pseudo-random sequence is not predictable or, when used as a message key, does not repeat itself.

Description of the Prior Art

It is generally known to employ a feedback sheet register for generating a pseudo-random sequence of signs and to implement this shift register with individual logic circuits ("wired-logic"). As only some of the bits must be processed in the register this implementation is substantially optimal. If, in contrast therewith, a computer (microprocessor) is used then this technique is far from optimal as a microprocessor is primarily designed for performing logic and arithmetical operations on a number of bits in parallel.

SUMMARY OF THE INVENTION

The invention has for its object to provide a method of generating a pseudo-random sequence of signs of a large sequence length which can both be programmed in a simple way on a computer and be realized with few technical means in the form of a specific separate arrangement. According to the invention, the method of generating a pseudo-random sequence of signs is characterized in that the method comprises the following steps:

generating a first sub-sequence by adding a first random character to a first prime number;

generating a second (possibly a third, ... generally a next) sub-sequence by adding a second (possibly a third, ... generally a next) random character to either a first factor times a second prime number (possibly a third, ... generally a next one), if the result of the sub-sequence obtained during the preceding addition is less than a predetermined value or to a second factor times the second prime number (possibly the third, ... generally the next one) if the result of the sub-sequence obtained during the preceding addition exceeds the predetermined value, the second factor differing from the first factor;

generating the pseudo-random sequence by joining together the first and the second sub-sequences (and possibly the third, ... generally the subsequence sub-sequence(s)).

It is advantageous for the pseudo-random sequence, the sub-sequences, the prime numbers, and the random characters to contain binary signs, the X sub-sequences, the prime numbers, and the random characters each containing N binary signs and the pseudo-random sequence containing XN binary signs.

BRIEF DESCRIPTION OF THE DRAWINGS

The invention and its advantages will be further described by way of example with reference to the accompanying drawing. Therein

DESCRIPTION OF THE PREFERRED EMBODIMENT

Figure 1:
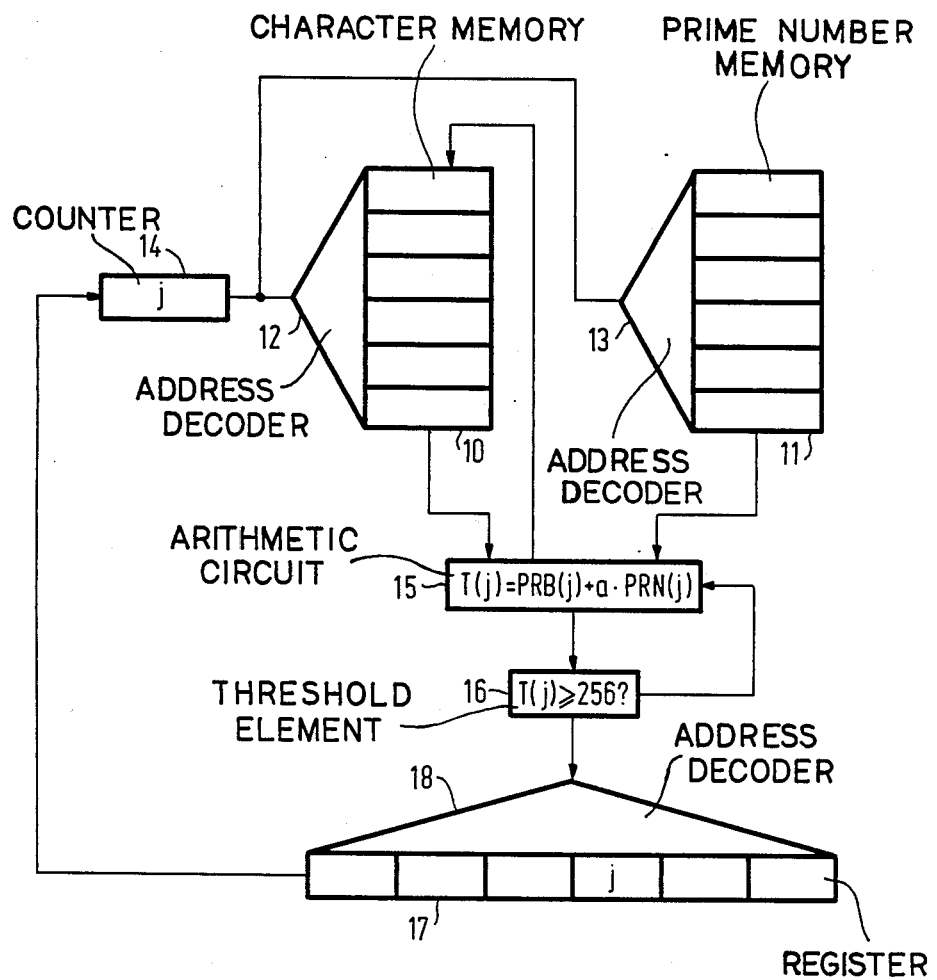
FIG. 1 shows an embodiment of an arrangement for performing the method according to the invention.

The arrangement for generating a pseudo-random sequence of signs of a large sequence length, shown in FIG. 1 comprises a first memory 10 for storing a plurality of characters and a second memory 11 for storing a plurality of prime numbers. Both memories 10 and 11 comprise an address decoder 12 and 13, respectively, connnected to the output of a counter 14. The counting position of counter 14 indicates which memory location of memories 10 and 11 must be addressed. The memory 10 has a number of memory locations for storing pseudo-random characters and memory 11 has the same number of memory locations for storing prime numbers. In the further course of the description, let it be assumed by way of example that each memory 10, 11 has six locations and that each location can contain 8-bit words. So as to provide that the memory locations of the two memories are sequentially addressed, it is advantageous to implement the counter as a modulo-6 counter. It will be obvious that if the number of memory locations is chosen greater or smaller than 6 the modulo number of the counter is adapted thereto.

In addition, the arrangement comprises an arithmetical circuit 15 connected to an output of the memory 10 and an output of memory 11 for performing the operation:

$$PRB(j)+a.PRN(j)$$

The result of this operation is $T(j)$. Herein j denotes the instantaneous counting position ($1<j<6$ in the example chosen); $PRB(j)$ is the content of the $j^{th}$ location of the random character memory 10, $PRN(j)$ is the content of the $j^{th}$ location of the prime number memory 11 and a may have the value of a first or a second factor. The value of the factor a depends on the value of the result $T(j-1)$ of the operation, performed by the arithmetical circuit 15 at the preceding counting position $(j-1)$. If that result exceeds a predetermined value then a obtains (or keeps) the value of the second factor. If the $(j-1)^{th}$ result is less than or equal to said predetermined value then a obtains (or keeps) the value of the first factor. In the example chosen the predetermined value is 255, i.e. the largest number of 8-bit memory location can contain. An advantageous value for the first factor is 1, for the second factor 2.

The result of the operation at the $j^{th}$ counting position $(T(j))$ is applied to a threshold element 16. If, $T(j) \geq 256$ then a is made equal to 2 and otherwise a is made equal to 1. In both cases the desired value of a is transferred to the arithmetical circuit 15 via an output of threshold element 16. In addition, the result $T(j)$ is written (modulo-256) in the pseudo-random character memory 10 at address j, the preceding pseudo-random character just used being overwritten. For that purpose an output of arithmetical circuit 15 is connected to an input of memory 10.

The result of the operation at the $j^{th}$ counting position (T(j)) is finally (also modulo-256) written in the $j^{th}$ position of a register 17 via address decoder 18. This result T(j), forms the $j^{th}$ sub-sequence in the register 16. After each sub-sequence has been recorded a signal is applied to an input of counter 14 via an output of register 17 for incrementing the counting position by one.

Thus, after j has passed through each value (in the example chosen after j has reached the value 6) register 17 will contain a pseudo-random sequence of signs, which sequence is assembled from 6 sub-sequences each having 8 bits. Thereafter this random sequence of signs can be employed as a message key for encoding messages.

A new pseudo-random sequence can be generated by repeating the above-described method.

The arrangement shown in FIG. 1 is initiated by writing the required prime numbers into memory 11 and writing pseudo-random characters into memory 10. This pseudo-random character may alternatively be obtained on the basis of the random bit patterns produced in memory 10, after this memory 10 has been activated. The bit patterns, generated in this known manner are known as "memory garbage". It has further been found that prime numbers located in the area from $\frac{1}{4}$ to $\frac{1}{2}$ of the maximum number than can be stored in the memory locations must be preferred for cryptographical reasons.

Moreover, the threshold element 16 may be of such an implementation that it is determined whether during the operation T(j) a carry has occurred or not occurred in the most significant bit. If so, then the value of the second factor must be assigned to a, if not then the value of the first factor is assigned to a.

In the general case that a pseudo-random sequence comprising N x M signs must be generated, counter 14 will have N counting positions (modulo N-counter), the memories 10, 11 will each have N locations of M bits and the predetermined value will preferably be $2^M$.

The arrangement shown in FIG. 1 has the advantage that the logic and arithmetical operations are effected in parallel, that is to say simultaneously on a number of bits, so that a pseudo-random sequence having a long sequence length is generated in a simple and efficient way.

Figure 2:
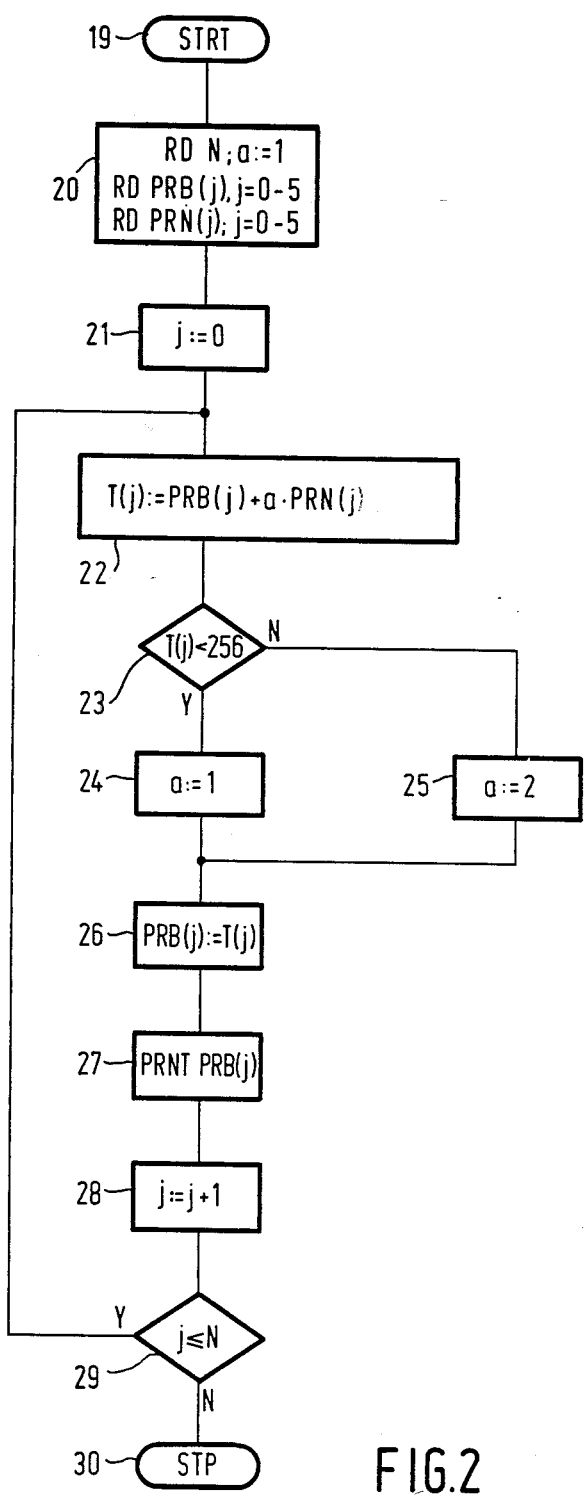
FIG. 2 is a flow chart for a further embodiment of the method in accordance with the invention.

FIG. 2 shows a flow chart of a further embodiment of the method according to the invention. The following explanatory texts are associated with the instruction codes of the geometric Figures which describe the timesequential functions and states of the method of generating a pseudo-random sequence. It should be noted that such a time-sequence of functions and associated states of the method of generating a pseudo-random sequence can be realized in universal, sequential, programmable logic circuits such as commercially available microprocessors with associated memories and peripheral equipment.

| Reference numeral | Instruction code | Specification |
|---|---|---|
| 19 | STRT | Start; |
| 20 | RD N; a:=1 RD PRB(j); j=0-5 RD PRN(j); j=0-5 | The value of a number Parameters are written in The pseudo-random sequence contains N sub-sequences and the value of the first (multiplication) factor is 1. In the flow chart it is further assumed that the value 6 is chosen for N. The value of the (six) pseudo-random characters PRB(j), j=0=1, ... 5 and prime numbers PRN(j), j=0, 1 ..., 5, is also written into the memories. |
| 21 | j=0 | A value 0 is assigned to the parameter $\underline{j}$ |
| 22 | T(j)=PRB(j)+ a.PRN(j) | The sum T(j) of the $j^{th}$ pseudo-random character PRB(j) and $\underline{a}$ times the $j^{th}$ prime rumber PRN(j) is determined; |
| 23 | T(j) <256 | The result of the sum T(j) is compared with a predetermined value. This value is 256 in the present example (in the general case $2^M$). If the result is less than 256 then the next operation is the operation which is represented by the geometric FIG. 24. If the result is not less than 256 the next operation is the operation represented by the geometric FIG. 25; |
| 24 | a:=1 | The value of the first multiplicatiom factor is made equal to 1. The next operation is then the operation represented by geometric FIG. 26. |
| 25 | a:=2 | The value of the second (multiplication) factor is made equal to 2. |
| 26 | PRB(j):=T(j) | The value of the $j^{th}$ pseudo-random character PRB(j) is made equal to the value of the $j^{th}$ result T(j), at least modulo 256 |
| 27 | PRNT PRB(j) | The value of the $j^{th}$ pseudo-random character PRB(j) is printed |
| 28 | j:=j+1 | The value of parameter $\underline{j}$ is incremented by one |
| 29 | j ≦ N | The value of $\underline{j}$ is compared with the value of N. If $\underline{j}$ is less than or equal to N then proceed to the geometrical FIG. 22. If, in contrast therewith $\underline{j}$ is larger than N then proceed to geometric FIG. 30 |
| 30 | STP | Stop. This geometric Figure is reached after $\underline{j}$ has reached the value 6 and the six values of a pseudo-random character PRB(j), have been printed. |

It should be noted that it is not important to the invention and for the flow chart of FIG. 2 if different values are chosen for the parameters M, a and N.

What is claimed is:

1. Apparatus for generating a pseudo-random sequence of digital bits which constitute a message key for encrypting a message, such apparatus comprising:

a first memory for storing a series of N preselected prime numbers;

a second memory for storing a series of N random characters;

arithmetic means connected to said first and second memories for generating N subsequences of bits, the first of such subsequences being generated by adding a first of said random characters to a first of said prime numbers, each jth ($j \leq N$) of such subsequences being generated by adding the jth of said random characters to the product of the jth of said series of prime numbers multiplied by:
(i) a predetermined first factor when the (j−1)th subsequence is less than a predetermined value;
(ii) a predetermined second factor when the (j−1)th subsequence is equal to or greater than said predetermined value;
a register coupled to said arithmetic means for storing each of the subsequences generated thereby;
and counter means connected to said register and to each of said first and second memories for reading out therefrom the jth random character and the jth prime number to said arithmetic means in response to storage of the (j−1)th subsequence in said register;
the content of said register after storage of all N subsequences therein constituting said message key.

2. Apparatus as claimed in claim 1, wherein said arithmetic means supplies the (j−1)th subsequence generated thereby to said character memory for storage therein as the jth of said random characters.

3. Apparatus as claimed in claim 1, wherein N=6, each of said subsequences comprises 8 binary bits, said first factor is 1, said second factor is 2, and said predetermined value is $2^8$.

* * * * *